(No Model.)
S. C. C. CURRIE.
ELECTRIC METER.
No. 427,748. Patented May 13, 1890.
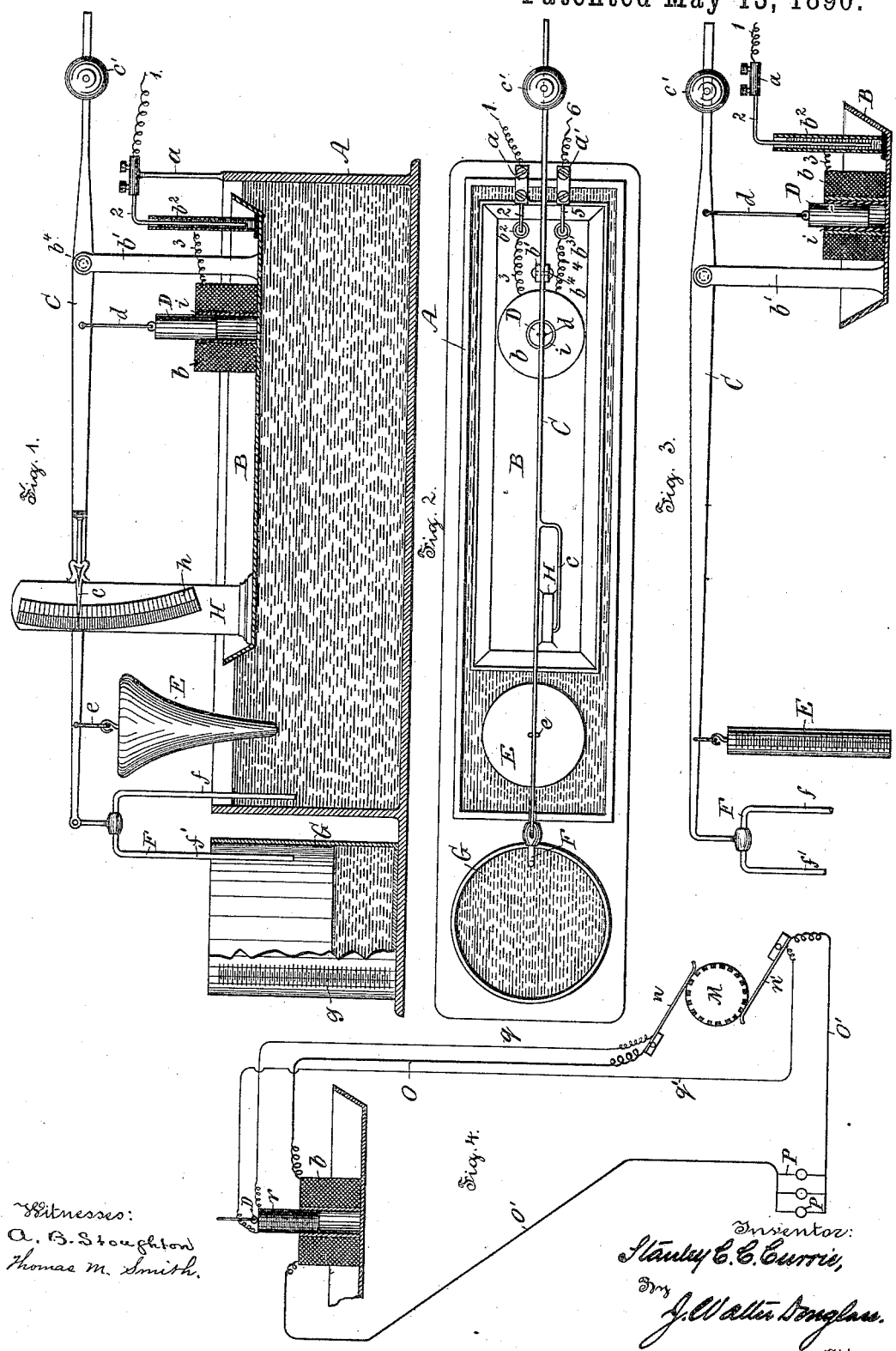
Witnesses:
A. B. Stoughton
Thomas M. Smith
Inventor:
Stanley C. C. Currie,
By J. Walter Douglass.
Atty.

UNITED STATES PATENT OFFICE.

STANLEY CHARLES CUTHBERT CURRIE, OF PHILADELPHIA, PENNSYLVANIA, ASSIGNOR TO THE UNITED ELECTRIC IMPROVEMENT COMPANY, OF GLOUCESTER CITY, NEW JERSEY.

ELECTRIC METER.

SPECIFICATION forming part of Letters Patent No. 427,748, dated May 13, 1890.

Application filed November 25, 1889. Serial No. 331,528. (No model.)

*To all whom it may concern:*

Be it known that I, STANLEY CHARLES CUTHBERT CURRIE, a subject of the Queen of Great Britain, but now residing at the city of Philadelphia, in the county of Philadelphia and State of Pennsylvania, have invented certain new and useful Improvements in Electric Meters, of which the following is a specification.

My invention relates to electric meters provided with magnetic means for actuating the measuring and registering mechanism thereof.

It is well understood that in the employment of a solenoid for actuating a meter the pull is not directly proportional to the quantity of electric energy traversing the solenoid and circuit, and therefore the quantity of electricity registered in a given time by a meter actuated by a solenoid is not only inaccurate, but the registering unreliable or erroneous.

The principal objects of my invention are, first, to provide a method of accurately ascertaining the quantity or strength of an electric current traversing a circuit in a given time; second, to provide an inexpensive, simple, and durable apparatus for accurately ascertaining the quantity of electricity traversing a circuit in a given time, and, third, to provide simple mechanism for avoiding inaccuracies and errors in the measurement of the quantity of electricity traversing a magnetic device interposed in a circuit, which are consequent upon the varying proportion of the pull exerted by such device to the quantity of electricity passing therethrough.

The nature and characteristic features of my present invention will be more fully understood, taken in connection with the accompanying drawings, in which—

Figure 1 is a longitudinal central section of a meter embodying the particular features of my invention. Fig. 2 is a top or plan view thereof. Fig. 3 is a view, partly in section and partly in elevation, of a modified form of my invention with the lower portions of the meter removed; and Fig. 4 is a view, partly in section and partly in elevation, of a portion of the meter with the electro-magnetic device so arranged that the movement of the plunger of said device is dependent not only upon the current of the main circuit alone, but also upon the electro-motive force of the circuit, thereby measuring with accuracy the amount of electric energy traversing a circuit in a given time.

Referring to the drawings, A represents a tank, provided with two binding-posts $a$ and $a'$. Upon the surface of a liquid or fluid contained in the tank A floats a buoy B. The pan or buoy B sustains at one end thereof a helical coil of wire or a magnet $b$, a bifurcated post or standard $b'$, and two mercury-cups $b^2$ and $b^3$, and at the opposite end a support H, carrying a segmental scale $h$. The oscillating lever C, provided with a pointer or index-finger $c$, is connected with the bifurcated extremity of the post or standard $b'$ by means of a pivot $b^4$. This lever C is provided with an adjustable counter-weight $c'$. The core D of the magnet $b$, Figs. 1, 2, and 3, made of soft iron, is pivotally connected with the oscillating lever C by means of the link $d$, and extends into the space included within the helical coil of wire $b$. A float E is pivoted to a link $e$, which is similarly connected with oscillating lever C, and extends into the liquid contained in the tank A. An inverted-U-shaped capillary tube F is pivotally secured to the oscillating lever C, and one of the depending extremities $f$ thereof is submerged a short distance in the liquid contained in the tank A, the other depending extremity $f'$ of this tube extending outside of the tank A into a vessel G, having a graduated scale $g$ formed on the circumferential surface thereof. The pan or buoy B is allowed a freedom of vertical movement, but is retained in proper relative position in the tank A by means of wires immersed in mercury-cups $b^2$ and $b^3$ in any preferred manner.

1 is a wire or other conductor connected with one of the binding-posts and leading from a source of electric energy. 2 is a wire or conductor connected with said binding-post $a$ and dipping into the mercury-cup $b^2$. 3 is a wire or other conductor leading from said mercury-cup $b^2$ to the helical coil of wire $b$.

4 is a wire or other conductor leading from the helical coil of wire $b$ to the mercury-cup $b^3$.

5 is a conductor dipping into the mercury-cup $b^3$ and leading to the other binding-post $a'$, and 6 is a conductor connected with the binding-post $a'$ and completing the generator-circuit.

The coil of wire $b$ may be wound in the form of a helix around the hollow core or cylinder of diamagnetic substance or brass $i$, as shown in Fig. 1, or around a hollow core or cylinder of soft iron lined with a diamagnetic substance or brass, as shown in Fig. 3.

The mode of operation of my improved meter is as follows: The tank A and tube F are filled with a liquid, such as acidulated water, and the oscillating lever C so adjusted by means of the counter-weight $c'$ as that the end $f$ of the tube F may extend a short distance—say, one-eighth of an inch, more or less—beneath the surface of the liquid in the tank A, in which position the acidulated water will not be siphoned from the tank A into the vessel G. The meter having been included in circuit by means of the wires or conductors 1 and 6, the vessel G is placed in position alongside or adjacent to the tank A, and with the tube F, previously filled with a fluid or liquid by suction or otherwise, placed in position with the end $f'$, thereof extending into the vessel G. Preference is given to a tube with a very fine bore, because the fluid or liquid will remain in the tube even when raised entirely above the surface thereof, and, moreover, when one end of the tube is immersed a short distance (a quarter of an inch, more or less) into the liquid or fluid the same will not flow at the opposite end—that is, of course, assuming that the two depending portions of the tube are of equal length. This is due to the fact that the pressure or head is not sufficient to overcome the capillary attraction, and hence for the first readings from the zero-point commences from a point slightly below the surface of the liquid or fluid. This is of considerable importance, for the reason that the tube need never be raised entirely out of the liquid or fluid, and consequently never emptied. It will thus be clearly seen that according to the amount of current passing through the helix $b$ will the plunger D, and consequently the tube F, be proportionally lowered, and thereby the amount of the fluid which will flow in a given time from the tank A through the tube F into the vessel G will be dependent upon the current through said coil $b$. At the same time the rate or strength of the current flowing at any moment may be observed by the pointer $c$ on the dial H. The attraction on an iron core by a solenoid will not alone cause the various depths of immersion of the tube F, so as to cause the flow of the liquid through said tube F consequent upon the variations in the "head" to give absolute proportions.

In order to obtain the desired absolute proportional results, a displacement-float E is suspended from the movable lever C at any preferred point, and the shape of said float is such that the resistance exerted against the downward movement of the lever by its displacement of the liquid is so proportioned at the various depths that the immersion of the tube F, and consequently the flow of the liquid therethrough, is exactly proportional to the amount of current passing through the coil in a given time. This float E may be caused to assume, among other forms, that of a cylinder, as in Fig. 3, or that of a cone or pyramid, as in Fig. 1, or of an inverted cone or pyramid, the former offering a constant resistance and the latter an increasing resistance or a decreasing resistance, as may be desired. The shape or form of said floats will of course depend upon the nature of the electro-magnetic devices employed. For example, as in the case of a plain solenoid, with the arrangement of the parts as shown in Figs. 1 and 2 the upper part of the displacement-float will be considerably larger than the lower end, while on the other hand, if a repelling action is required—such as illustrated in Fig. 3—the forces exerted upon the lever-arm C at varying distances are a decreasing ratio in contradistinction to an increasing one, as in the employment of a plain solenoid, and consequently a float will be made use of in such a case in the form of a cone or pyramid, but inverted as compared with that employed in conjunction with the solenoid. Again, when a device is used in which the forces are in direct proportion—such as in an ammeter or voltmeter—a float in the shape or form of a cylinder will be employed for insuring the best results.

During the operation of the meter the pan or buoy B will sink farther into the fluid or liquid of the tank A; but the contact from the circuit through the coil B is maintained by means of the wires or conductors dipping into the mercury-cups $b^2$ and $b^3$. It will be seen by this arrangement that if by accident or thoughtlessness the water should sink below a certain level the circuit will be automatically broken and the lamps in circuit thereby extinguished.

Fig. 3 represents an arrangement in which the coil $b$ surrounds a hollow soft-iron cylinder fixed to the coil, together with a lining of brass, and within which the soft-iron core D is free to move. In this instance the current passing through the coil will cause the said core to be repelled consequent upon the mutual action between itself and the fixed soft-iron hollow cylinder or tube $i$. The above are examples of the many other magnetic or electrical appliances which may be available of for actuating said oscillating lever C.

From the position of the index $c$ with reference to the scale $h$, Figs. 1 and 2, and from the position of the float E with reference to the surface of the liquid, Fig. 3, the passage of the current through the meter at any moment of time may be ascertained, and by measuring the quantity of water which has been passed by drops from the tank A into the vessel G in a given length of time the quantity of electricity which has traversed the meter in that time may be accurately ascertained. Moreover, instead of measuring the quantity of water in the vessel G the scale $g$ may be so graduated that the height of the water as indicated thereby will represent the number of units of electricity that have passed through the meter in the given time.

Fig. 4 represents, instead of a solid soft-iron core D, a coil of wire capable of actuating as a plunger and sliding with the larger coil $b$. If the smaller coil be composed of fine wire and of sufficiently high resistance, the combined action of the two coils upon one another will cause the device to register the amount of electric energy passing in a given time. This arrangement is also applicable to alternating currents as well as for direct currents.

M is the armature of the dynamo, and $n$ and $n'$ the brushes thereof. O and O' are conductors in contact with said brushes, respectively, and form the generator-circuit. P are the lamps included in said circuit. $q$ and $q'$ are conductors connected with said brushes $n$ and $n'$ and constitute a shunt to the lamp-circuit.

Having thus described the nature and objects of my invention, what I claim as new, and desire to secure by Letters Patent, is—

1. An electric meter consisting of a tank containing a liquid, a solenoidal magnetic device, a resistance-float, and a capillary tube actuated by said device, substantially as and for the purposes described.

2. An electric meter consisting of a tank containing a liquid, a buoy supporting an electro-magnet, a fulcrumed lever, a float, a soft-iron core pivotally connected with said lever, and a siphon secured to said lever and actuated by said magnet included in an electric circuit, substantially as and for the purposes described.

3. An electric meter consisting of a tank containing a liquid, an electro-magnet and a fulcrumed lever, a soft-iron core, a siphon, and a float connected with said lever and actuated by said magnet, substantially as and for the purposes described.

4. An electric meter consisting of a tank containing a liquid, a magnetic device, a counterbalanced lever, a displacement-float, a capillary tube connected therewith and actuated by said magnetic device, substantially as and for the purposes described.

5. An electric meter consisting of a tank containing a liquid, a displacement-float, a solenoid, an oscillating lever carrying the core of said solenoid, an index-finger, a capillary tube, a graduated scale, and means for actuating said solenoid, substantially as and for the purposes described.

6. An electric meter consisting of a tank containing a liquid, a magnetic device, a graduated displacement-float, and a capillary tube actuated by said magnetic device, substantially as and for the purposes described.

7. An electric meter consisting of a tank containing a liquid, a float, a buoy supporting a magnetic device, a lever, a graduated scale, and index-finger, and a capillary tube, two mercury-cups, conductors immersed therein, and wires connected with said conductors in an electric circuit, substantially as and for the purposes set forth.

8. An electric meter consisting of a fluid, a fulcrumed lever provided with a tube, a displacement-float and a counter-weight, and a device for actuating said fulcrumed lever, substantially as and for the purposes set forth.

9. An electric meter consisting of a tank containing a fluid, a pivotal lever carrying an adjustable counter-weight, a tube and a float, and a magnetic device for actuating said lever, substantially as and for the purposes set forth.

10. In an electric meter, a liquid, a displacement-float, a graduated vessel, an inverted-U-shaped tube, and means, substantially as described, to cause one end of said tube to be immersed in said fluid, substantially as and for the purposes set forth.

11. An electric meter consisting of a fluid, a lever-arm supporting a graduated float and a capillary tube, and a magnetic device included in a circuit and actuating said lever-arm, substantially as and for the purposes set forth.

12. An electric meter consisting of a fluid, a vessel supporting a varying-resistance float, a lever carrying a capillary tube and a float, and a solenoid included in a circuit and actuating said lever, substantially as and for the purposes set forth.

13. An electric meter consisting of a tank containing a fluid, a buoy supporting a fulcrumed lever provided with a counter-weight, a capillary tube, and a graduated float, a magnetic device interposed in an electric circuit and adapted to actuate said fulcrumed lever, substantially as and for the purposes set forth.

14. An electric meter consisting of a fluid, a pivotally-supported lever carrying a tube and a displacement-float, a varying-resistance float, and an index-finger connected with said lever and contacting with the scale of said resistance-float, a graduated vessel, and means to actuate said pivotal lever, substantially as and for the purposes set forth.

15. An electric meter consisting of a tank containing a fluid, a buoy supporting a lever-arm having a counter-weight mounted thereon and a displacement-float and an inverted-U-shaped tube pivotally suspended therefrom, and an index-finger connected with said lever-arm, a resistance-float mounted on said buoy, conductors mounted in mercury-cups in an electric circuit, and a magnetic device included therein and actuating said lever-arm, substantially as and for the purposes set forth.

16. In an electric meter, a fluid, a magnetic device, a displacement-float, as described, suspended from a movable lever, and a tube connected with said lever, and the said float and tube actuated by said magnetic device, substantially as and for the purposes described.

In witness whereof I have hereunto set my signature in the presence of two subscribing witnesses.

STANLEY CHARLES CUTHBERT CURRIE.

Witnesses:
GEO. W. REED,
HERMANN BORMANN.